US012260984B1

(12) United States Patent
Tanifuji et al.

(10) Patent No.: US 12,260,984 B1
(45) Date of Patent: Mar. 25, 2025

(54) COIL COMPONENT

(71) Applicant: SUMIDA CORPORATION, Tokyo (JP)

(72) Inventors: Masami Tanifuji, Natori (JP); Kaito Suzuki, Natori (JP); Toshimasa Monma, Natori (JP); Sho Maesawa, Natori (JP)

(73) Assignee: SUMIDA CORPORATION (JP)

( * ) Notice: Subject to any disclaimer, the term of this patent is extended or adjusted under 35 U.S.C. 154(b) by 0 days.

(21) Appl. No.: 18/728,951

(22) PCT Filed: Dec. 25, 2023

(86) PCT No.: PCT/JP2023/046354

§ 371 (c)(1),
(2) Date: Jul. 15, 2024

(51) Int. Cl.
*H01F 27/29* (2006.01)
*H01F 27/02* (2006.01)
*H01F 27/24* (2006.01)

(52) U.S. Cl.
CPC ........... *H01F 27/292* (2013.01); *H01F 27/02* (2013.01); *H01F 27/24* (2013.01)

(58) Field of Classification Search
CPC ......... H01F 27/292; H01F 27/02; H01F 27/24
See application file for complete search history.

(56) References Cited

U.S. PATENT DOCUMENTS 4,238,753 A 12/1980 Bayer
5,117,215 A * 5/1992 Kakehashi ............ H01F 27/306 336/212
8,203,414 B2 6/2012 Tao et al.
2019/0080836 A1* 3/2019 Yasuda .................... H01F 27/29
2021/0249181 A1* 8/2021 Yasuda ................. H01F 27/263
2022/0102050 A1* 3/2022 Monma .................... H01F 27/26

FOREIGN PATENT DOCUMENTS

| | | | |
|---|---|---|---|
| CN | 109473255 | A | 3/2019 |
| CN | 113257540 | A | 8/2021 |
| CN | 113366592 | A | 9/2021 |
| DE | 102017005255 | A1 | 12/2017 |
| EP | 3923306 | A1 | 12/2021 |

(Continued)

OTHER PUBLICATIONS

International Search Report of the International Searching Authority, issued in PCT/JP2023/046354, mailed Feb. 20, 2024; ISA/JP (6 pages).

(Continued)

*Primary Examiner* — Malcolm Barnes
(74) *Attorney, Agent, or Firm* — Harness, Dickey & Pierce, P.L.C.

(57) ABSTRACT

A coil component includes a first core, a second core, and a base unit in which a housing recess is formed. The second core includes a flat plate section and a leg. The leg extends from one end portion of the flat plate section toward the bottom surface of the housing recess in the axial direction of a coil. The housing recess includes a first space and a second space. A winding core section of the first core is housed in the first space. The second space is a space different from the first space. The leg is housed in the second space. The base unit includes a leg restricting section. The leg restricting section is disposed on the inward side of the leg in the axial direction.

9 Claims, 11 Drawing Sheets

(56) References Cited

FOREIGN PATENT DOCUMENTS

| | | | | |
|---|---|---|---|---|
| JP | S57155823 | U | | 9/1982 |
| JP | S59131112 | U | | 9/1984 |
| JP | 2009224649 | A | * | 10/2009 |
| JP | 2019050280 | A | | 3/2019 |
| JP | 2020126909 | A | | 8/2020 |
| JP | 2021125695 | A | | 8/2021 |
| KR | 10-2019-0028298 | A | | 3/2019 |
| KR | 10-2021-0108471 | A | | 9/2021 |
| WO | 2020-162334 | A1 | | 8/2020 |

OTHER PUBLICATIONS

Written Opinion of the International Searching Authority, issued in PCT/JP2023/046354, mailed Feb. 8, 2024; ISA/JP (7 pages).

European Searrh Report issued in the corresponding European Patent Application No. 23908695.2; dated Feb. 13, 2025 (total 9 pages).

* cited by examiner

COIL COMPONENT

CROSS REFERENCE TO RELATED APPLICATIONS

This Application is a 371 U.S. National Phase of International Application No. PCT/JP2023/046354, filed on Dec. 25, 2023. The entire disclosure of the above application is incorporated herein by reference.

BACKGROUND

Technical Field

The present invention relates to a coil component.

Related Art

As a coil component, there is a coil component including a core divided into a plurality of pieces, a coil being wound around a part of the core. Concerning a technique of this type, Japanese Patent Laid-Open No. 2020-126909 discloses a coil component (100) including an insulated frame body (24), two cores (a magnetic core (10) and a second magnetic core (23)), and a coil (54). Specifically, the magnetic core (10) having a U shape is housed in the insulated frame body (24) and the coil (54) is wound around the insulated frame body (24) and the magnetic core (10) having the U shape. The second magnetic core (23) having an I shape is disposed above the magnetic core (10) having the U shape.

Parts of sides of the second magnetic core (23) having the I shape are surrounded by walls such as first walls (27) of the insulated frame body (24).

However, in the coil component (100) in Japanese Patent Laid-Open No. 2020-126909, a problem can occur in that the second magnetic core (23) can be disposed to shift with respect to the insulated frame body (24). Specifically, a problem can occur in that the second magnetic core (23) is shifted in the axial direction of the coil (54) with respect to the insulated frame body (24) or shifted to rotate with respect to the insulated frame body (24) when viewed from above.

For example, when a coil component is placed on a mounting substrate and surface-mounted, in some cases, the position and the direction of a magnetic core disposed above, which visually recognized from above, are regarded as the position and the direction of the entire coil component and the coil component is aligned with the mounting substrate. In this case, if the second magnetic core (23), which is the magnetic core disposed above, is disposed to shift in the axial direction or the rotation direction with respect to the insulated frame body (24), a problem can occur in that the coil component is not disposed in an appropriate position or direction with respect to the mounting substrate.

Besides, when the magnetic core disposed above (the second magnetic core (23)) is disposed to shift in the axial direction or the rotation direction with respect to the insulated frame body (24), the magnetic core disposed above (the second magnetic core (23)) can be disposed to shift with respect to the magnetic core disposed below (the magnetic core (10)). In this case, an appropriate magnetic characteristic sometimes cannot be obtained.

The present invention has been made in view of the problems described above and provides a coil component in which a core disposed above is prevented from being disposed to shift in the axial direction of a coil with respect to a base unit or shifted to rotate with respect to the base unit when viewed from above.

SUMMARY

A coil component of the present invention includes: a first core; a base unit in which a housing recess is formed and the first core is housed in the housing recess; a terminal unit provided in the base unit; at least one coil connected to the terminal unit and spirally disposed around a winding core section in the first core and the base unit; and a second core disposed above the first core. The second core includes a flat plate section and a leg extending from one end portion in an axial direction of the coil of the flat plate section toward a bottom surface of the housing recess. The housing recess includes a first space in which the winding core section is housed and a second space that is a space different from the first space and in which the leg is housed. The base unit includes a leg restricting section disposed on an inward side of the leg in the axial direction.

In the coil component of the present invention, the second core disposed above includes the leg extending downward and the leg restricting section (a restricting section) of the base unit is disposed on the inward side of the leg in the axial direction. Accordingly, when the second core is about to shift in the axial direction with respect to the base unit or is about to shift to rotate when viewed from above, the restricting section restricts the movement of the second core, whereby the shift of the second core is suppressed.

Effect of the Invention

With the coil component of the present invention, the second core is prevented from shifting with respect to the base unit by the restricting section. Accordingly, it is possible to provide the coil component in which the second core disposed above is prevented from being disposed to shift in the axial direction of the coil with respect to the base unit or shifted to rotate with respect to the base unit when viewed from above.

BRIEF DESCRIPTION OF THE DRAWINGS

The object described above, other objects, features, and advantages are further clarified by preferred embodiments explained below, and the accompanying drawings as follows.

FIG. 10 is a sectional view corresponding to the alternate long and short dash line in FIG. 3 of the coil component according to the second embodiment and is a sectional view viewed in a direction corresponding to the direction of the arrow line VIII-VIII in FIG. 3.

DETAILED DESCRIPTION

Figure 1:
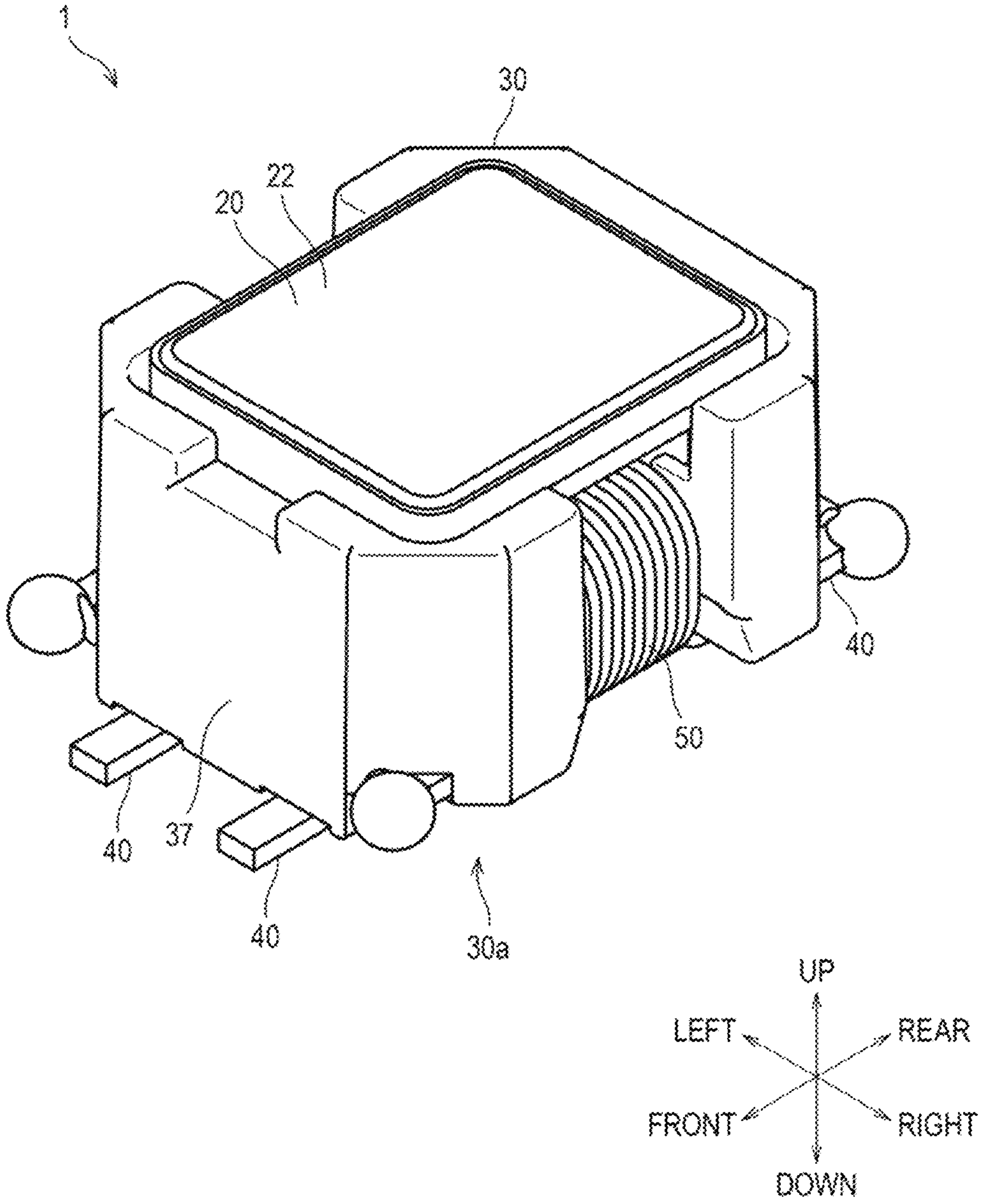
FIG. 1 is a perspective view showing an example of a coil component according to a first embodiment of the present invention.

Various components of a coil component of the present invention do not need to be individually independent existences. For example, a plurality of components may be formed as one member, one component may be formed by a plurality of members, a certain component may be a part of another component, and a part of a certain component and a part of another component may overlap.

Embodiments of the present invention are explained below with reference to the drawings. Note that, in the drawings, corresponding components are denoted by a common sign and redundant explanation is not repeated.

Note that, in the present embodiments, front-rear, left-right, and up-down directions are defined and explained as illustrated. However, this is conveniently defined in order to briefly explain relative relations among components and does not limit directions at the time of manufacturing and at the time of use of a product that implements the present invention. The up-down direction in the present embodiments is a direction orthogonal to the surface of a mounting substrate in the case in which a coil component is placed on the mounting substrate. When the coil component is placed on a horizontal mounting substrate, the up-down direction and the vertical direction coincide. However, when the coil component is placed on an inclined mounting substrate, the up-down direction is a direction inclined with respect to the vertical direction. The front-rear direction and the left-right direction are sometimes referred to as lateral direction. In the present embodiments, the front-rear direction coincides with the axial direction of a coil. The left-right direction is sometimes referred to as width direction of the coil component. The up-down direction is sometimes referred to as the height direction of the coil component or a member in the coil component.

A plane referred to in the present invention means a shape intended to be physically formed into a plane and, naturally, does not need to be a geometrically complete plane.

First Embodiment (Coil Component)

Figure 2:
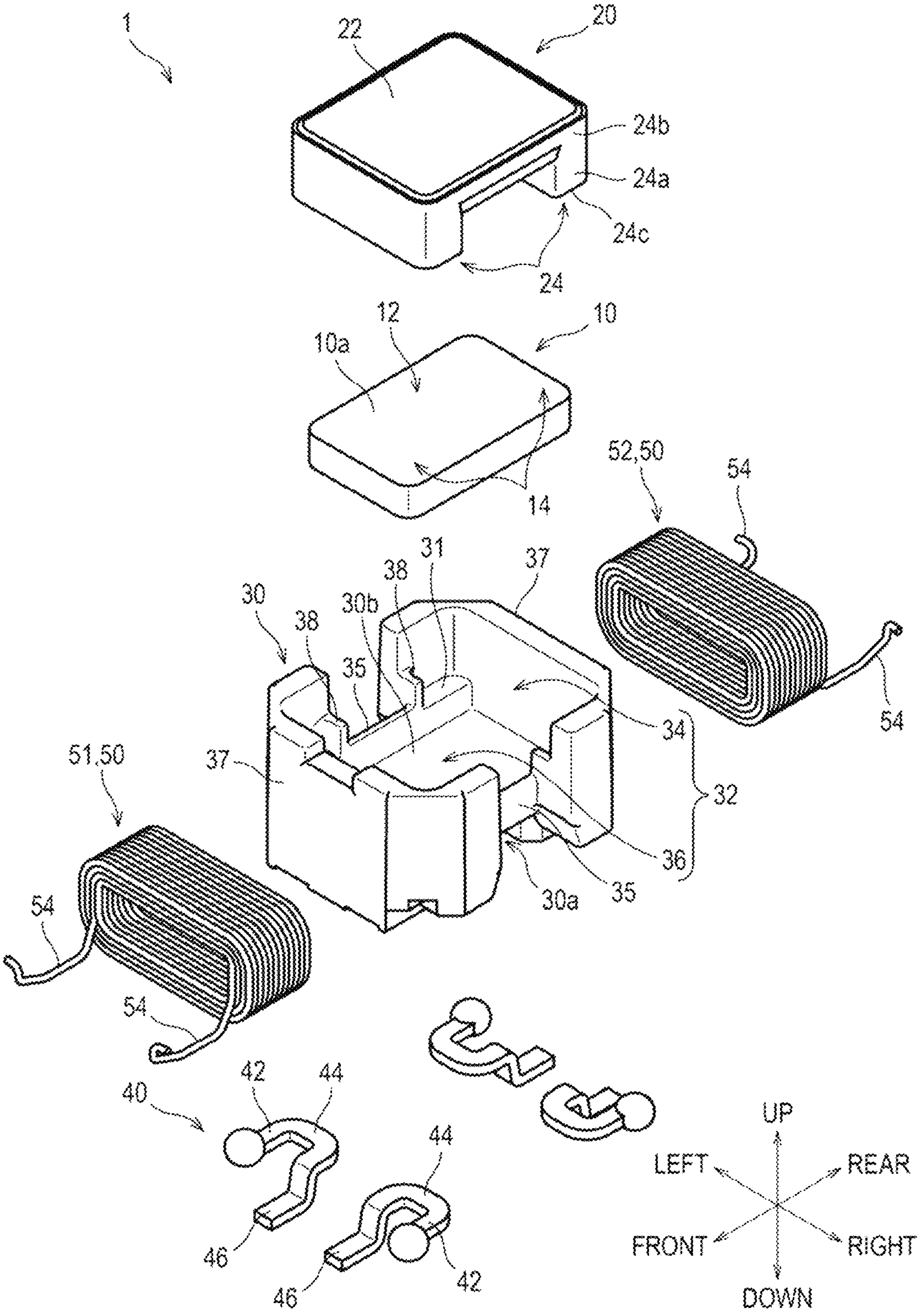
FIG. 2 is an exploded perspective view of the coil component according to the first embodiment.

FIG. 1 is a perspective view showing an example of a coil component 1 according to a first embodiment of the present invention. FIG. 2 is an exploded perspective view of the coil component 1.

First, an overview of the coil component 1 in the present embodiment is explained.

As illustrated in FIG. 2, the coil component 1 in the present embodiment includes a first core 10, a base unit 30, a terminal unit 40, at least one coil 50, and a second core 20. A housing recess 32 is formed in the base unit 30. In the base unit 30, the first core 10 is housed in the housing recess 32. The terminal unit 40 is provided in the base unit 30. The coil 50 is connected to the terminal unit 40. The coil 50 is spirally disposed around a winding core section 12 in the first core 10 and the base unit 30. The second core 20 is disposed above the first core 10.

The second core 20 includes a flat plate section 22 and legs 24. The legs 24 extend from one end portions in the axial direction of the coil 50 (core end portions 14) of the flat plate section 22 toward the bottom surface of the housing recess 32.

The housing recess 32 includes a first space 34 and a second space 36. The winding core section 12 is housed in the first space 34. The second space 36 is a space different from the first space 34. The legs 24 are housed in the second space 36.

The base unit 30 includes leg restricting sections (restricting sections 38). The restricting sections 38 are disposed on the inward side of the legs 24 in the axial direction.

In the coil component 1 of the present invention, the second core 20 disposed above includes the legs 24 extending downward and the restricting sections of the base unit are disposed on the inward side of the legs 24 in the axial direction. Accordingly, when the second core 20 is about to shift in the axial direction with respect to the base unit 30 or is about to shift to rotate when viewed from above, the restricting sections 38 restrict the movement of the second core, whereby the shift of the second core is suppressed. Accordingly, it is possible to provide the coil component 1 in which the second core 20 disposed above is prevented from being disposed to shift in the axial direction of the coil 50 with respect to the base unit 30 or shift to rotate with respect to the base unit 30 when viewed from above. Note that the second core 20 shifting in the axial direction of the coil 50 with respect to the base unit 30 is sometimes referred to as lateral shift and the second core 20 shifting to rotate with respect to the base unit 30 when viewed from above is sometimes referred to as rotational shift.

Subsequently, the coil component 1 in the present embodiment is explained in detail.

The coil component 1 is an electronic component including the coil 50. The electronic component is a component that can configure a part of an electronic circuit. As the coil component 1, a transformer, an antenna, an inductor, or the like is exemplified. The coil component 1 in the present embodiment is disposed and mounted such that a mounting surface of the terminal unit 40 explained below is brought into contact with a not-illustrated mounting substrate.

The coil 50 is a member obtained by a conductive material being spirally disposed. The coil 50 in the present embodiment is a coil obtained by a coil wire, the cross section of which has a circular shape, being spirally disposed. The coil 50 may be formed by a coil wire, the cross section of which has a flat shape (a rectangular shape, an elliptical shape, or the like). The coil 50 is not limited by a manufacturing method and may be a coil in general obtained by a conductive material being spirally formed. In the present embodiment, the coil 50 is formed by winding the coil wire around the first core 10 and the base unit 30. The coil wire in the coil 50 may be in press contact with or may be in contact with the upper surface of the first core 10 or winding core side sections 35 or a bottom surface section 30*a* of the base unit 30. Alternatively, the coil wire may be disposed to bite into the winding core side sections 35 or the bottom surface section 30*a* of the base unit 30. Alternatively, the coil wire may be separated from the upper surface of the first core 10 or the winding core side sections 35 or the bottom surface section 30*a* of the base unit 30.

Alternative to the present embodiment, the coil 50 may be formed in advance by spirally disposing the conductive material such that a core portion is hollow. In this case, after the formation of the coil, the first core 10 and the base unit 30 may be inserted into a hollow portion of the coil. The inner surface (a peripheral surface of a flat wire) of a winding section 53 and the first core 10 or the base unit 30 may be separated or may be in contact.

The coil component 1 may include one or a plurality of coils 50. In the present embodiment, the coil component 1 includes two coils 50 (a first coil 51 and a second coil 52). Both of the axial direction of the first coil 51 and the axial direction of the second coil 52 are the front-rear direction. The respective axial directions of the first coil 51 and the second coil 52 are disposed in parallel to each other. More specifically, a winding shaft of the first coil 51 is disposed on the same straight line as a winding shaft of the second coil 52.

The coil 50 includes the winding section 53 around which the coil wire is wound. The coil 50 includes drawn-out sections 54 that are both end portions of the coil wire and parts of the coil wire drawn out from the winding section 53. In the coil 50 in the present embodiment, both the end portions of the coil wire is drawn out. Each of both the end portions is connected to the terminal unit 40.

Figure 3:
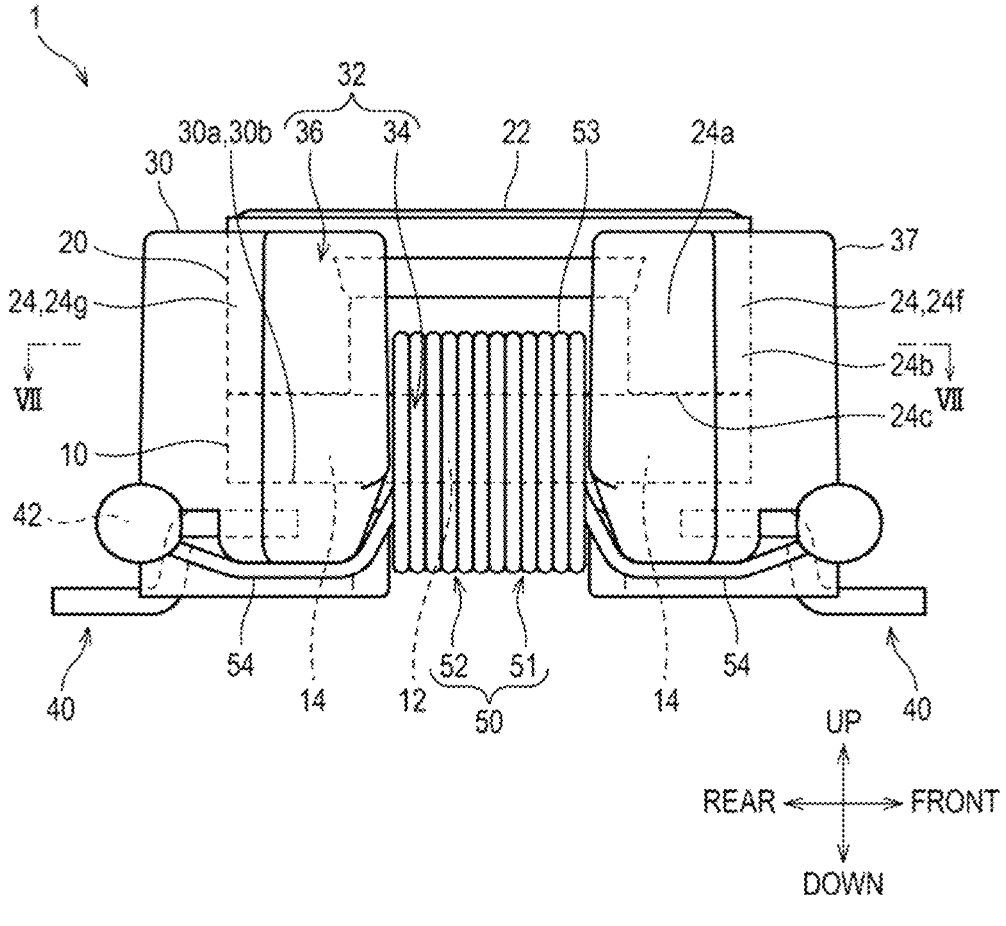
FIG. 3 is a left side view of the coil component according to the first embodiment.
Figure 4:
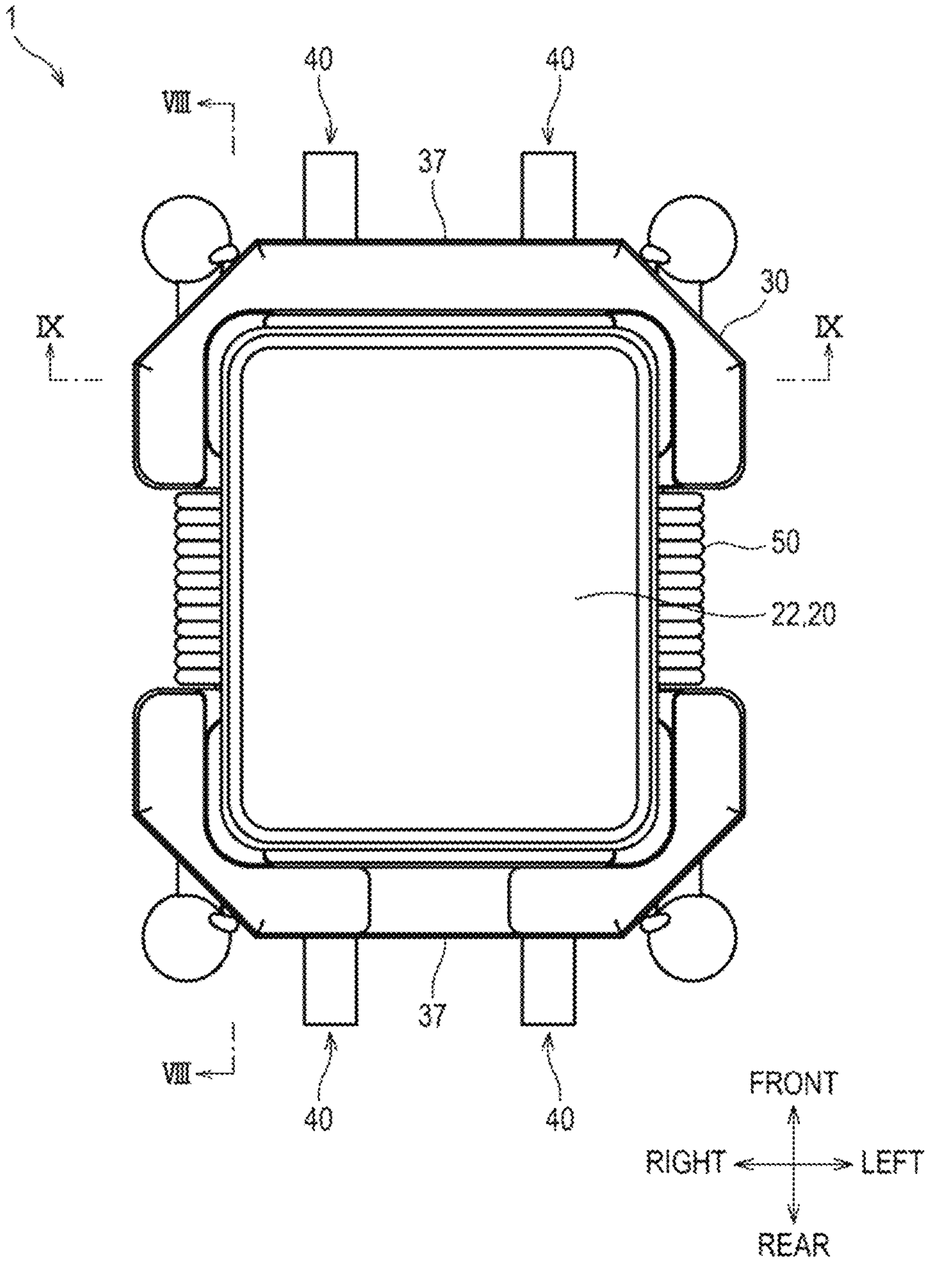
FIG. 4 is a top view of the coil component according to the first embodiment.
Figure 6:
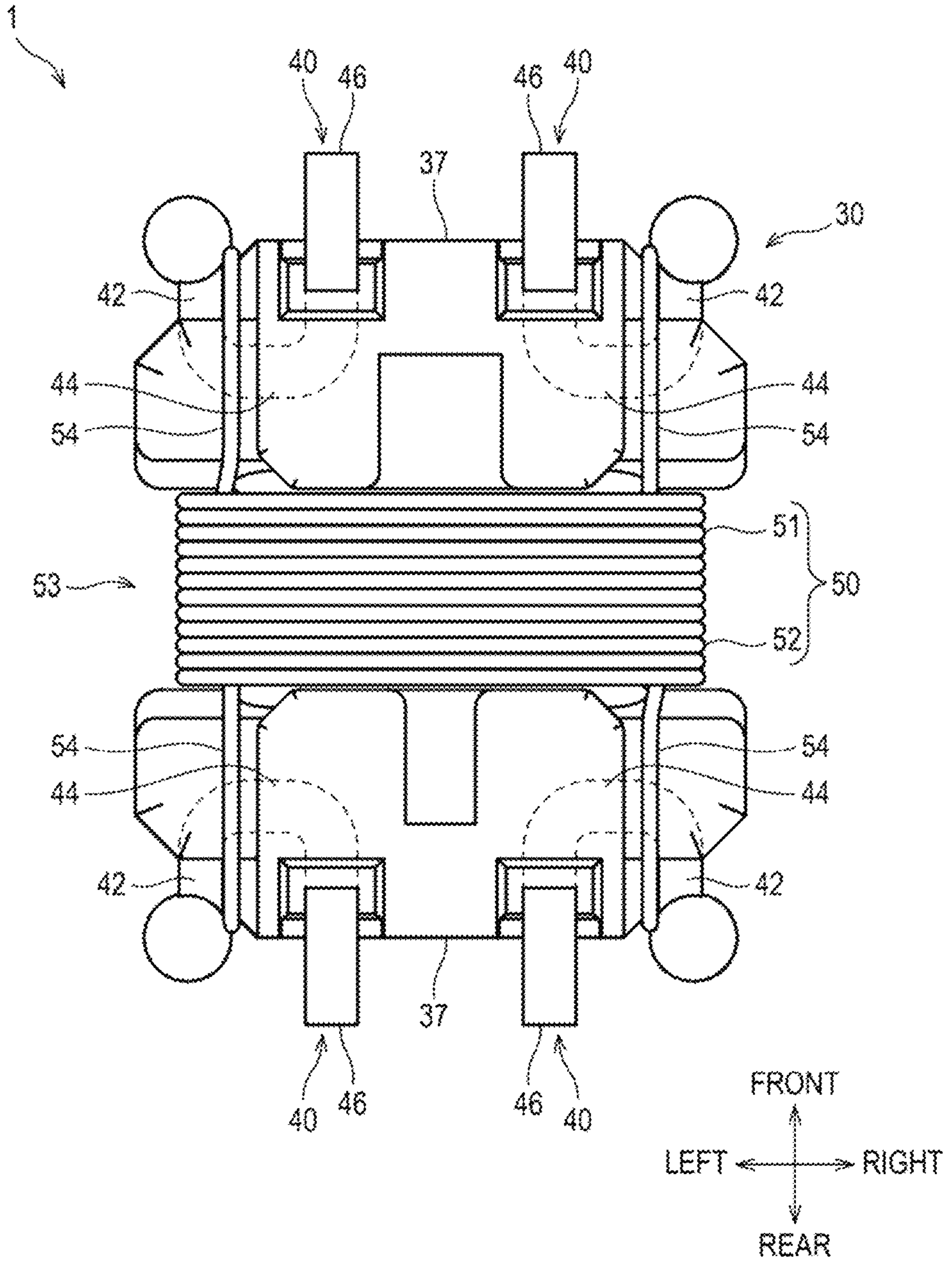
FIG. 6 is a bottom view of the coil component according to the first embodiment.

As illustrated in FIG. 3, the drawn-out sections 54 extend toward the terminal unit 40 (connecting wire sections 42). More specifically, as illustrated in FIG. 6, the drawn-out sections 54 are wired along the lower surface of the base unit 30 and range from the winding section 53 to the connecting wire sections 42. The drawn-out sections 54 and the connecting wire sections 42 are electrically connected.

The terminal unit 40 is an electrode member electrically connected to the coil 50. The terminal unit 40 serves as an input electrode or an output electrode of the coil component 1. The terminal unit 40 is formed of a conductive member such as metal.

As illustrated in FIG. 6, two terminal units 40 are provided in each of two sidewall sections 37 explained below. The terminal units 40 include the connecting wire sections 42, intermediate sections 44, and mounting sections 46.

The connecting wire sections 42 are parts to which the end portions of the drawn-out sections 54 are connected. The coil component 1 in the present embodiment is manufactured by the end portions of the drawn-out sections 54 being bound to the connecting wire sections 42 and the connecting wire sections 42 and the end portions of the drawn-out sections 54 being welded in a manufacturing process. The connecting wire sections 42 and the drawn-out sections 54 may be joined by soldering or the like.

The mounting sections 46 are, in the terminal units 40, parts grounded to a substrate (not illustrated) when the coil component 1 is mounted. Specifically, the mounting sections 46 include mounting surfaces facing downward. The mounting surfaces and the substrate are come into surface contact. The mounting sections 46 and the substrate are joined by soldering or the like.

The intermediate sections 44 are parts disposed between the connecting wire sections 42 and the mounting sections 46. In the present embodiment, the intermediate sections 44 are embedded in the base unit 30. The connecting wire sections 42 and the mounting sections 46 are exposed from the base unit 30.

The cores (the first core 10 and the second core 20) are members formed by a magnetic material. In the present embodiment, the first core 10 is a so-called I core and the second core 20 is a so-called U core. The first core 10 and the second core 20 are combined to configure a closed magnetic path. The shapes of the first core 10 and the second core 20 are not limited to the shapes described above. For example, the first core 10 and the second core 20 may have L shapes and may be combined to form the closed magnetic path. Alternatively, both of the first core 10 and the second core 20 may be U cores.

A not-illustrated adhesive may be disposed between the first core 10 and the second core 20. Specifically, an upper surface 10*a* of core end portions 14 explained below may be bonded to lower surfaces 24*c* of the legs 24 via the adhesive. A sheet (a spacer sheet of a nonmagnetic body) for forming a gap may be disposed between the first core 10 and the second core 20. Two spacer sheets may be disposed between the core end portion 14 on the front side and the lower surface 24*c* of the leg 24 and between a core end portion (the core end portion 14) on the rear side and the lower surface 24*c* of the leg 24. One spacer sheet may be disposed across both the end portions (the core end portions 14 and 14) in the first core 10. That is, one spacer sheet may be disposed on the entire upper surface of the first core 10. The spacer sheet may be disposed between the core end portion 14 on the front side and the leg 24 and between the core end portion 14 on the rear side and the leg 24.

The first core 10 is a core disposed below the second core 20. In the present embodiment, the first core 10 is a flat plate extending in the lateral direction. The coil 50 is wound around the winding core section 12 corresponding to the center of the first core 10 in the front-rear direction. Here, the coil 50 being wound around a predetermined member (the first core 10, the base unit 30, or the like) means that the coil 50 is disposed around the predetermined member. Some member may be disposed or may not be disposed between the predetermined member and the coil 50. That is, the coil 50 being wound around the predetermined member includes the coil 50 being indirectly or directly wound around the predetermined member. In the present embodiment, it can be said that the coil 50 is indirectly wound around the first core 10 via the base unit 30. Both the end portions of the first core 10 in the front-rear direction are the core end portions 14.

The second core 20 is a core disposed above the first core 10. The second core 20 may be in contact with the first core 10 and directly placed on the first core 10 or may be separated from the upper surface of the first core 10 and disposed above the first core 10. In the present embodiment, the lower surfaces of the legs 24 of the second core 20 explained below is in contact with the core end portions 14 of the first core 10 and the second core 20 is directly placed on the first core 10.

The second core 20 includes the flat plate section 22 and one or a plurality of legs 24. Specifically, the second core 20 includes two legs 24 adjacent to each of the end portions of the flat plate section 22 in the front-rear direction. The flat plate section 22 is a part having a flat plate shape extending in the lateral direction in the second core 20. The legs 24 are parts extending in a direction intersecting a main surface of the flat plate section 22 in the second core 20. The legs 24 are formed to project downward from the flat plate section 22. The legs 24 may extend in a direction orthogonal to the main surface of the flat plate section 22 or may extend in an oblique direction.

The base unit 30 is a member that holds the first core 10 and the second core 20. The base unit 30 is formed of an insulative material such as resin.

The housing recess 32 in the base unit 30 is a space in which the first core 10 or the second core 20 are disposed. In the present embodiment, the housing recess 32 is formed by the base unit 30 being recessed downward.

The housing recess 32 houses the first core 10. The housing recess 32 housing the first core 10 means that at least a part of the first core 10 is disposed in the housing recess 32. In the present embodiment, the entire first core 10 is disposed in the housing recess 32. More specifically, the first core 10 is disposed to extend across the first space 34 and the second space 36.

The first space 34 is a space in which the winding core section 12 of the first core 10 is housed. Specifically, the first space 34 is defined by the bottom surface section 30*a* and the winding core side sections 35. In the present embodiment, the upper end portion of the first space 34 is terminated on an imaginary upper surface of the base unit 30 (an imaginary surface including the upper end portions of the sidewall sections 37 explained below). A boundary in the front-rear direction of the first space 34 is explained below.

The winding core side sections 35 are parts disposed to stand from the bottom surface section 30*a* in the base unit 30. In the present embodiment, two winding core side sections 35 are disposed to be separated in the left-right direction. The winding core section 12 is disposed between the two winding core side sections 35.

The second space 36 being the space different from the first space 34 means that the second space 36 does not overlap the first space 34.

The second space 36 is a space in which at least a part of the leg 24 of the second core 20 is disposed. In the present embodiment, the housing recess 32 includes two second spaces 36 that house respectively each of a pair of legs 24 disposed to be separated in the front-rear direction. The two second spaces 36 are disposed across the first space 34 in the front-rear direction.

Figure 5:
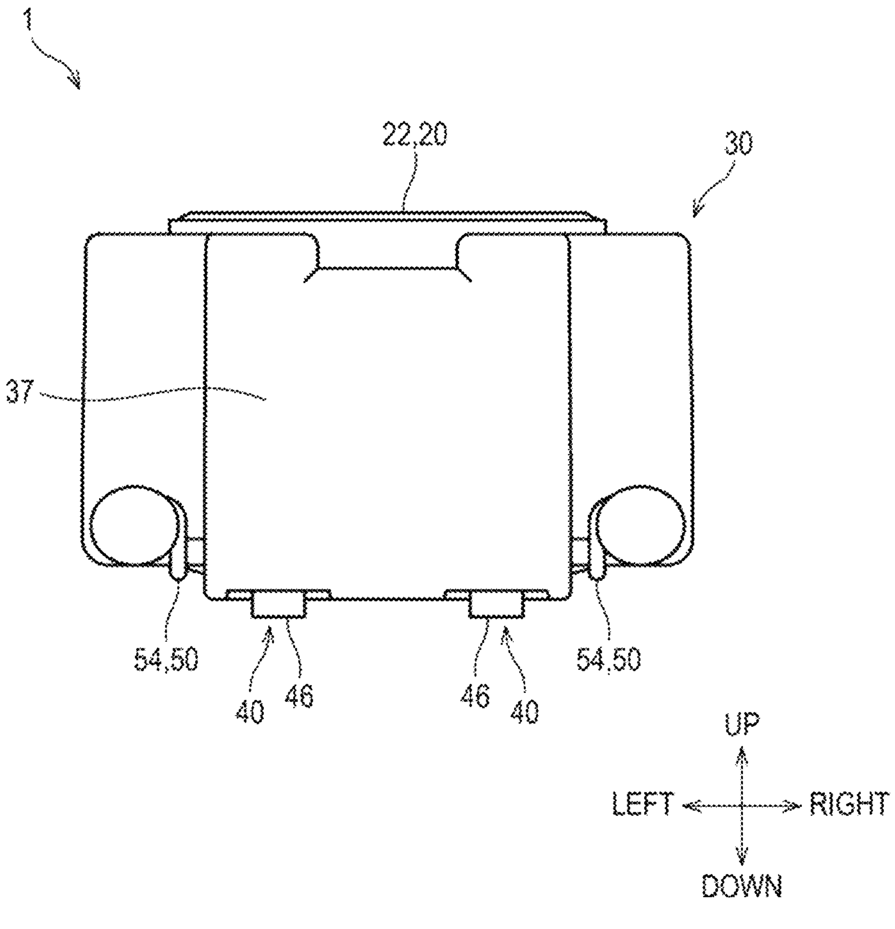
FIG. 5 is a front view of the coil component according to the first embodiment.

The second space 36 is defined by the bottom surface section 30*a* and the sidewall section 37. The bottom surface section 30*a* is a part including the lower surface of the base unit 30. The sidewall section 37 is a part of a wall formed to stand from the bottom surface section 30*a* in the base unit 30 and formed in a U shape in plan view to surround the side of the leg 24. Specifically, the sidewall section 37 is disposed on the outward side of the leg 24 in the front-rear direction and on both the sides of the leg 24 in the left-right direction. Here, the outward side in the front-rear direction means a side of a peripheral edge of the base unit 30 in the front-rear direction (a peripheral edge of the base unit 30 viewed from above). In inward side in the front-rear direction means a side of the center of the base unit 30 in the front-rear direction (the center of the base unit 30 viewed from above). The upper end of the second space 36 in the present embodiment is an imaginary surface including the upper end portion of the sidewall section 37 (an imaginary surface extending in the lateral direction). In the present embodiment, as illustrated in FIG. 5, a part on the upper surface side of the second core 20 (in particular, the flat plate section 22) is disposed above the upper end portion of the sidewall section 37. That is, a part on the upper surface side of the flat plate section 22 is disposed outside an envelope volume of the base unit 30. In other words, a part on the lower surface side of the flat plate section 22 of the second core 20 is disposed in the housing recess 32 (in particular, the second space 36 or the first space 34) and a part on the upper surface side of the flat plate section 22 is disposed on the outside of the housing recess 32.

In the second space 36 in the present embodiment, the core end portion 14 of the first core 10 is also disposed in addition to the leg 24 of the second core 20. As in a third embodiment explained below, the core end portion 14 may not be disposed in the second space 36.

Figure 7B:
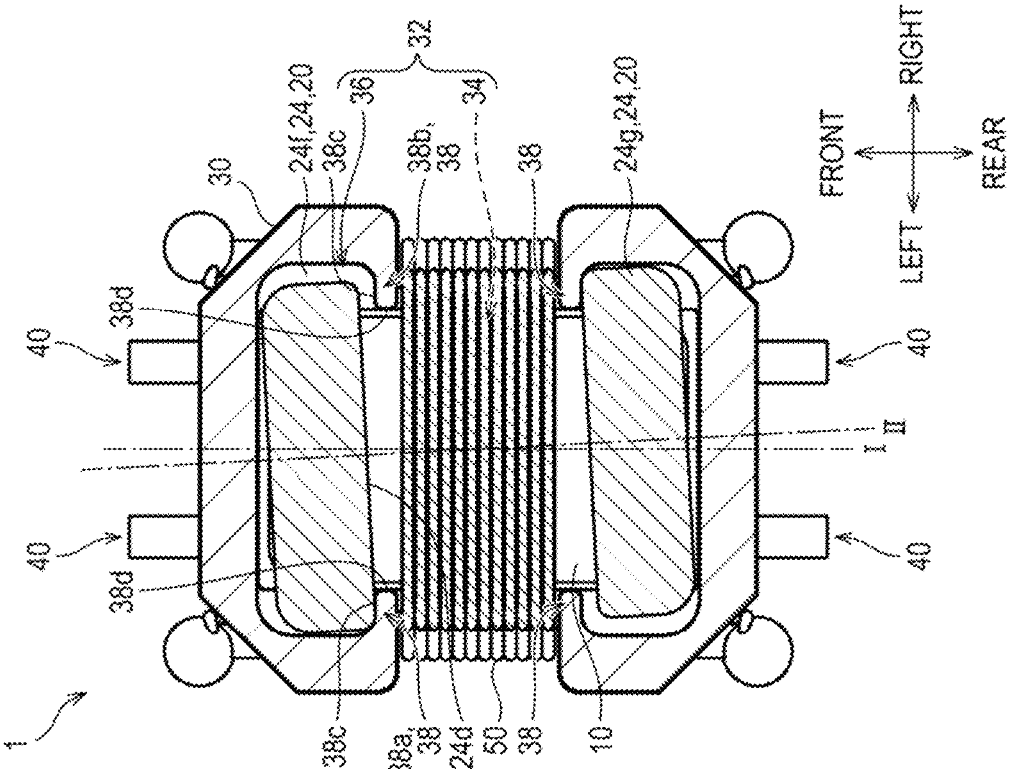
FIG. 7B is a sectional view in which the cross section along the alternate long and short dash line in FIG. 3 is viewed in the direction of the arrow line VII-VII in the case in which a second core is in a rotating state.
Figure 7A:
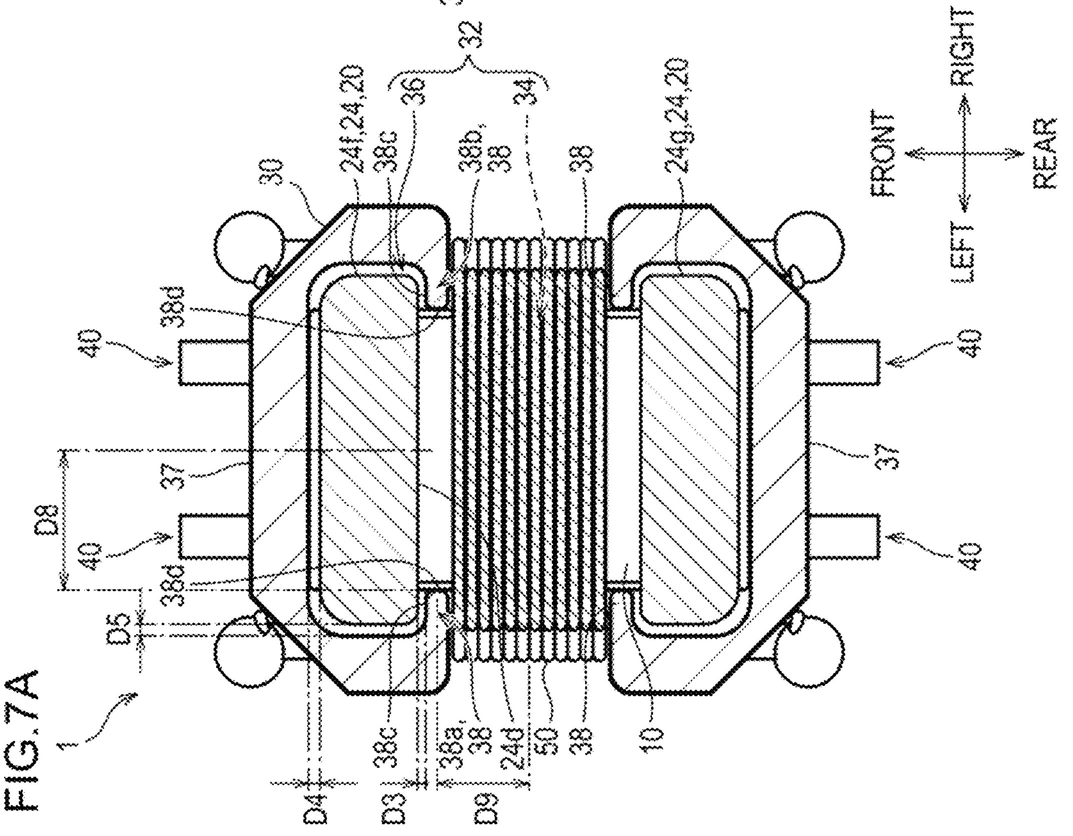
FIG. 7A is a sectional view in which a cross section along an alternate long and short dash line in FIG. 3 is viewed in a direction of an arrow line VII-VII.

Note that, as illustrated in FIG. 7A, the housing recess 32 includes a space between respective second side surfaces 38*d* of a pair of restricting sections 38 explained below (a space in which boundary portions between the core end portions 14 and the winding core section 12 in the first core 10 are disposed; referred to as boundary space). The boundary space may belong to the first space 34 or may belong to the second space 36.

As illustrated in FIG. 7A, the restricting sections 38 are parts of the base unit 30 and are parts that can restrict movement of the leg 24. Here, the restricting sections 38 being capable of restricting the movement of the leg 24 means that the restricting sections 38 are capable of restricting the leg 24 from moving with respect to the base unit 30 in a manufacturing process or a finished product of the coil component 1. The restricting sections 38 being able to restrict the movement of the leg 24 includes, besides the leg 24 being restricted from moving in a certain direction with respect to the base unit 30 in the finished product of the coil component 1, the leg 24 being capable of coming into contact with the restricting sections 38 and the restricting sections 38 being able to restrict the leg 24 from moving in the certain direction with respect to the base unit 30 in the manufacturing process of the coil component 1.

The restricting sections 38 are disposed adjacent to the leg 24 to restrict the movement of the leg 24. Here, the restricting sections 38 being adjacent to the leg 24 means that a separation distance between the restricting sections 38 and the leg 24 is a predetermined distance or less. Specifically, the separation distance (a distance D3) between the restricting sections 38 and the leg 24 is preferably smaller than a separation distance (a distance D4 or a distance D5) between the sidewall section 37 and the leg 24. More specifically, the distance between the restricting sections 38 and the leg 24 in the front-rear direction is preferably smaller than the distance (the distance D4) between the sidewall section 37 and the leg 24 in the front-rear direction or the distance (the distance D5) between the sidewall section 37 and the leg 24 in the left-right direction.

The restricting sections 38 in the present embodiment are inner wall sections extending in the left-right direction. The inner wall sections are considered to define each of the first space 34 and the second space 36. The inner wall sections are disposed to stand from the bottom surface section 30*a* (see FIG. 2) in the base unit 30. The inner wall sections are formed integrally with the sidewall section 37.

The shape of the restricting sections 38 is not limited to the inner wall sections in the present embodiment. For example, the restricting sections 38 may be column-shaped sections projecting upward from the bottom surface section 30*a*. The column-shaped sections may be formed to be separated from the sidewall section 37. Alternatively, the restricting sections 38 may be projecting sections formed to project to the inner side in the left-right direction from the sidewall section 37. The projecting sections may be separated from the bottom surface section 30*a* (see FIG. 2) in the base unit 30.

In the present embodiment, the dimension of the base unit 30 in the front-rear direction is larger than the dimension of the base unit 30 in the left-right direction. However, the dimension of the base unit 30 in the left-right direction has a predetermined or larger size with respect to the dimension of the base unit 30 in the front-rear direction. In other words, concerning a part of the base unit 30 forming the first space 34, the dimension in the left-right direction is larger than the dimension in the front-rear direction. The restricting section 38 is disposed in a position close to the center of the base unit 30 in the front-rear direction. More specifically, the distance (a distance D8) in the left-right direction between the center of the base unit 30 in the left-right direction and the restricting section 38 (the second side surface 38*d*) is larger than the distance (a distance D9) in the front-rear direction between the center of the base unit 30 in the front-rear direction and the restricting section 38 (the center in the front-rear direction of the restricting section 38 or the main surface on the winding section 53 side of the restricting section 38). A facing interval between the second side surfaces 38*d* in the pair of restricting sections 38 disposed side by side in the left-right direction is larger than the distance in the front-rear direction between a first leg 24*f* and a second leg 24*g* (a facing interval between inner side surfaces 24*d* of the pair of legs 24). With a dimension relation explained above, the inner side surfaces 24*d* of the legs 24 easily come into contact with the restricting sections 38 (in particular, the second side surfaces 38*d*).

In the present embodiment, the restricting sections 38 are also winding frame sections that assist in winding the coil 50. That is, the restricting sections 38 are disposed on the outward side of the coil 50 (the winding section 53) in the axial direction. More in detail, the restricting sections 38 are disposed between the coil (the coil wire in the winding section 53) and the legs 24 in the axial direction.

As illustrated in FIG. 7A, the base unit 30 includes a pair of restricting sections 38 (a first restricting section 38*a* and a second restricting section 38*b*). The pair of restricting sections 38 are disposed on both the sides of the first core 10 in the width direction of the base unit 30. Each of the first restricting section 38*a* and the second restricting section 38*b* is adjacent to each of both the end portions of one leg 24 in the left-right direction. Accordingly, a shift of the leg 24 is more satisfactorily suppressed.

Note that, in the present embodiment, the second core 20 includes two legs 24. Therefore, in the present embodiment, the restricting sections 38 are disposed adjacent to both the end portions of each of the legs 24. That is, in the present embodiment, the base unit 30 includes four restricting sections 38.

As illustrated in FIG. 7B, the leg 24 includes the inner side surface 24*d* facing the restricting section 38 side. An orthogonal direction indicated by an alternate long and short dash line II in FIG. 7B may be inclined with respect to an axial direction (a direction indicated by an alternate long and short dash line I in FIG. 7B). That is, the second core 20 may be disposed to rotate with respect to the axial direction when viewed from above. The orthogonal direction is a direction orthogonal to the inner side surface. In the present embodiment, it can be also said that the orthogonal direction is a direction in which the pair of legs 24 and 24 are disposed side by side.

It is possible to reduce a product error for an angle difference in a linear direction with respect to the axial direction by disposing the second core 20 to rotate in a predetermined direction. That is, it is possible to reduce a product error of a magnetic characteristic due to a positional shift of the second core 20 with respect to the first core 10.

The inner side surface 24*d* is a flat surface in the present embodiment but may be a slighted curved surface. When the inner side surface 24*d* is the curved surface, a direction orthogonal to a tangential line near the center of the inner side surface 24*d* in the left-right direction when viewed from above may be set as the orthogonal direction.

In the present embodiment, the inner side surface 24*d* is opposed to the main surface (a first side surface 38*c* explained below) of the restricting section 38 that is the inner wall section. The inner side surface 24*d* and the first side surface 38*c* may be disposed in parallel. The inner side surface 24*d* may be disposed in a position intersecting the first side surface 38*c*.

In the present embodiment, the second core 20 is disposed to rotate counterclockwise with respect to the axial direction. However, the second core 20 may be disposed to rotate clockwise with respect to the axial direction. An angle (a rotation angle) formed by the orthogonal direction and the axial direction is preferably larger than 0 degrees and smaller than 10 degrees. More preferably, the rotation angle is larger than 0 degrees and smaller than 5 degrees. This makes it possible to reduce occurrence of a shift in the position and the direction in placing the coil component 1 on the mounting substrate and surface-mounting the coil component 1.

In the present embodiment, the dimension (the width dimension) of the leg 24 in the left-right direction is larger than the dimension (the width dimension) of the core end portion 14 in the left-right direction. Accordingly, even when the second core 20 is disposed to rotate with respect to the axial direction, it is possible to prevent an area of a region where the second core 20 (the lower surfaces 24*c* of the leg 24 (see FIG. 9B)) and the first core 10 (the upper surface 10*a* of the core end portion 14 (see FIG. 9B)) overlap in the up-down direction from greatly decreasing. Accordingly, a large magnetic flux leak is prevented from occurring.

In the present embodiment, the distance between the first restricting section 38*a* of the pair of restricting sections 38 separated in the left-right direction and the inner side surface 24*d* in the front-rear direction is smaller than the distance between the second restricting section 38*b* of the pair of restricting sections 38 and the inner side surface 24*d* in the front-rear direction. The distance between the first restricting section 38*a* and the inner side surface 24*d* in the front-rear direction includes a case in which the first restricting section 38*a* and the inner side surface 24*d* are in contact and the distance is zero.

The orthogonal direction and the axial direction may be in parallel as illustrated in FIG. 7A instead of the orthogonal direction being inclined with respect to the axial direction as illustrated in FIG. 7B.

As illustrated in FIG. 7B, the leg 24 is in contact with the first restricting section 38*a* of the pair of restricting sections 38. On the other hand, the leg 24 is separated from the second restricting section 38*b* of the pair of restricting sections 38. Specifically, the inner side surface 24*d* in the leg 24 and the first side surface 38*c* in the first restricting section 38*a* are in contact. In a second embodiment explained below, the first side surface 38*c* and the inner side surface 24*d* shown in FIG. 10 may be in contact or the second side surfaces 38*d* and a side surface (in particular, a surface facing the outward side in the left-right direction) of a step section 24*e* shown in FIG. 10 may be in contact. By keeping the leg 24 in contact with the restricting section 38, it is possible to more satisfactorily reduce a product error for a positional shift of the second core 20 with respect to the first core 10.

In the present embodiment, the side surface facing the outward side of the leg 24 in the front-rear direction is in contact with the sidewall section 37. Since the leg 24 is in contact with two parts of the sidewall section 37 and the restricting section 38, the position of the second core 20 in the base unit 30 is satisfactorily fixed. In the present embodiment, a form in which each of the pair of legs 24 is in contact with the two parts of the sidewall section 37 and the restricting section 38 is exemplified. However, instead of this, one leg 24 may be in contact with the sidewall section 37 and separated from the restricting section 38 and the other leg 24 may be in contact with the restricting section 38 and separated from the sidewall section 37.

Figure 8:
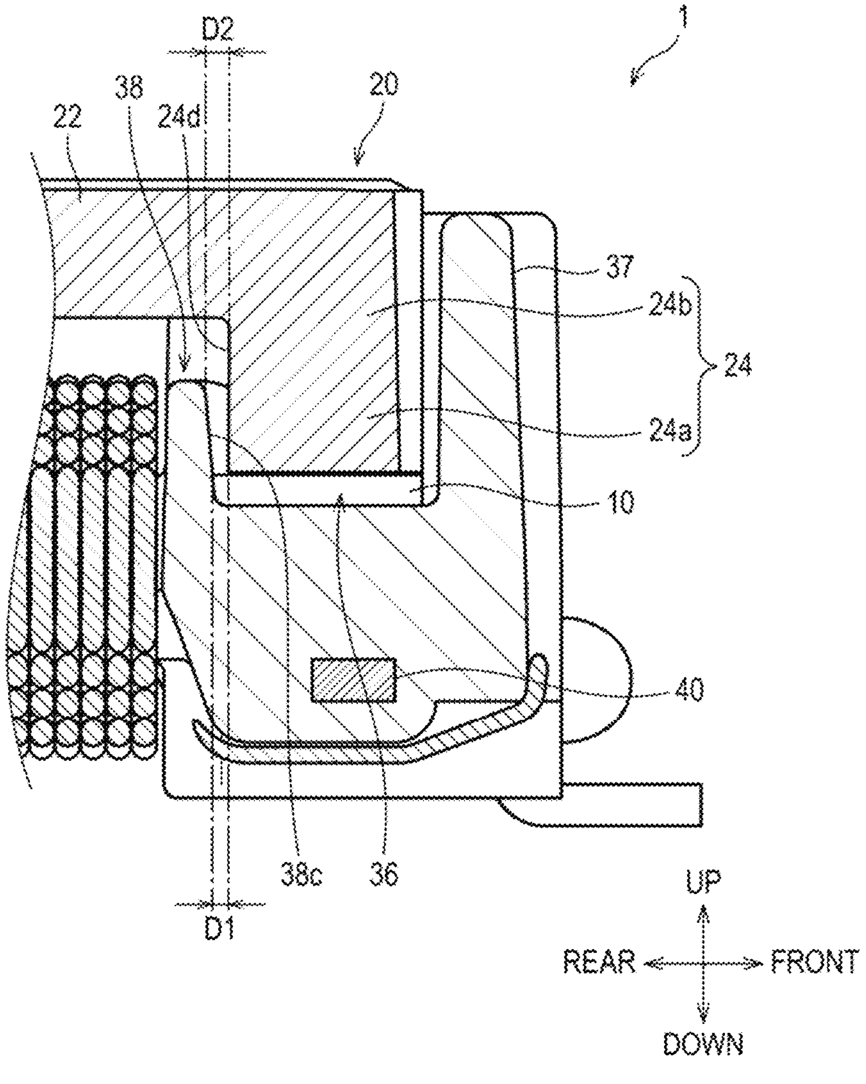
FIG. 8 is a sectional view in which a cross section along an alternate long and short dash line in FIG. 4 is viewed in a direction of an arrow line VIII-VIII.

As illustrated in FIG. 8, the first side surface 38*c* is a side surface facing the leg 24 in the restricting section 38. The first side surface 38*c* is also a main surface in the restricting section 38 that is the inner wall section. In the present embodiment, the first side surface 38*c* is inclined obliquely with respect to a placing direction (the up-down direction). The placing direction is a direction at the time when the second core 20 is placed on the first core 10. In other words, the placing direction is also a direction orthogonal to the upper surface of the first core 10 or the lower surface of the second core 20 (the lower surface 24*c* of the leg 24).

The distance (a distance D1) between the restricting section 38 and a lower end portion 24*a* in the leg 24 is smaller than the distance (a distance D2) between the restricting section 38 and an upper end portion 24*b* of the leg 24.

With the configuration explained above, the second space 36 is largely opened in an opening section and is narrowed in the vicinity of the bottom surface section 30*a*. As a result, it is possible to dispose the second core 20 in a desired position on the first core 10 while keeping easiness of disposing the second core 20 in the second space 36.

Note that, for convenience, the first side surface 38*c* in FIG. 8 is illustrated as being largely inclined.

The first side surface 38*c* being inclined with respect to the up-down direction more specifically means that the first side surface 38*c* is inclined to the outward side in the front-rear direction toward the bottom surface section 30*a* side (downward). Accordingly, the second space 36 is opened wider upward and is narrower downward. In particular, the dimension of the second space 36 in the front-rear direction is larger upward and is smaller downward.

In the present embodiment, the first side surface 38*c* is an inclined flat surface but is not limited to this surface. The first side surface 38*c* may be a curved surface. For example, the first side surface 38*c* may be a convex surface projecting to the leg side or may be a recessed concave surface.

The distance (the distance D2) between the upper end portion 24*b* of the leg 24 and the first side surface 38*c* is the distance between the surface at the upper end portion 24*b* (a part on the upper side of the inner side surface 24*d*) and a part (near the upper end) on the upper side of the first side surface 38*c* in the front-rear direction. The distance (the distance D1) between the lower end portion 24*a* of the leg 24 and the first side surface 38*c* is the distance between the surface at the lower end portion 24*a* (a part on the lower side of the inner side surface 24*d*) and a part (near the lower end) on the lower side of the first side surface 38*c* in the front-rear direction.

Figure 9A:
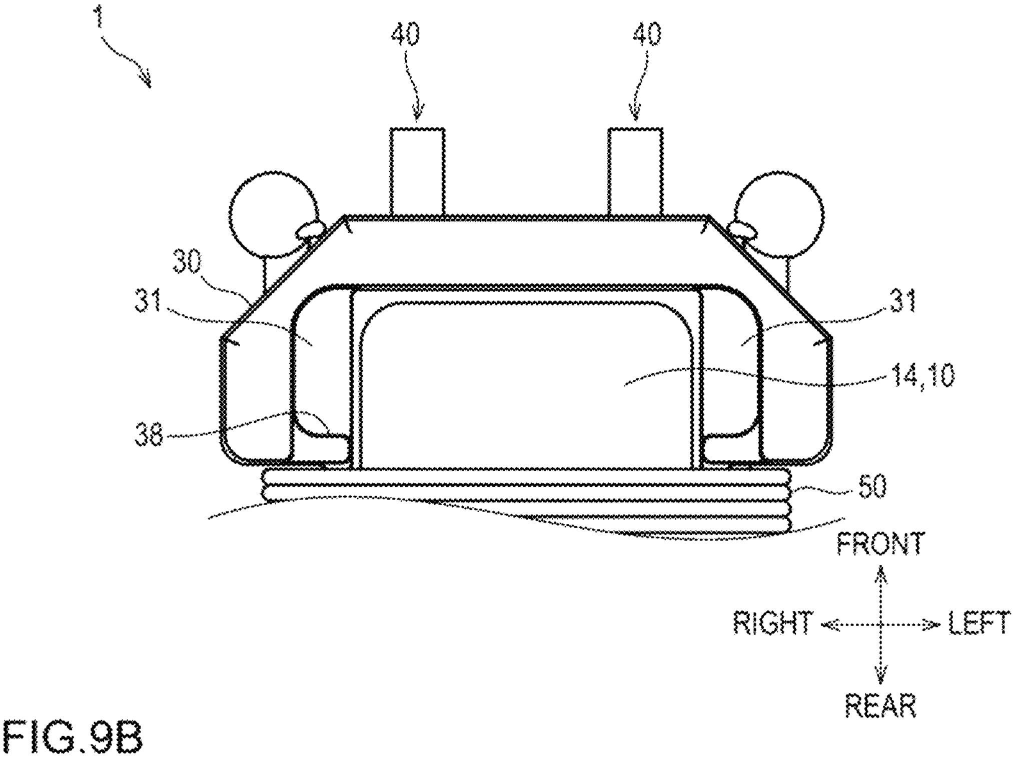
FIG. 9A is a top view of a front end portion of the coil component and the vicinity of the front end portion. The second core is not illustrated.
Figure 9B:
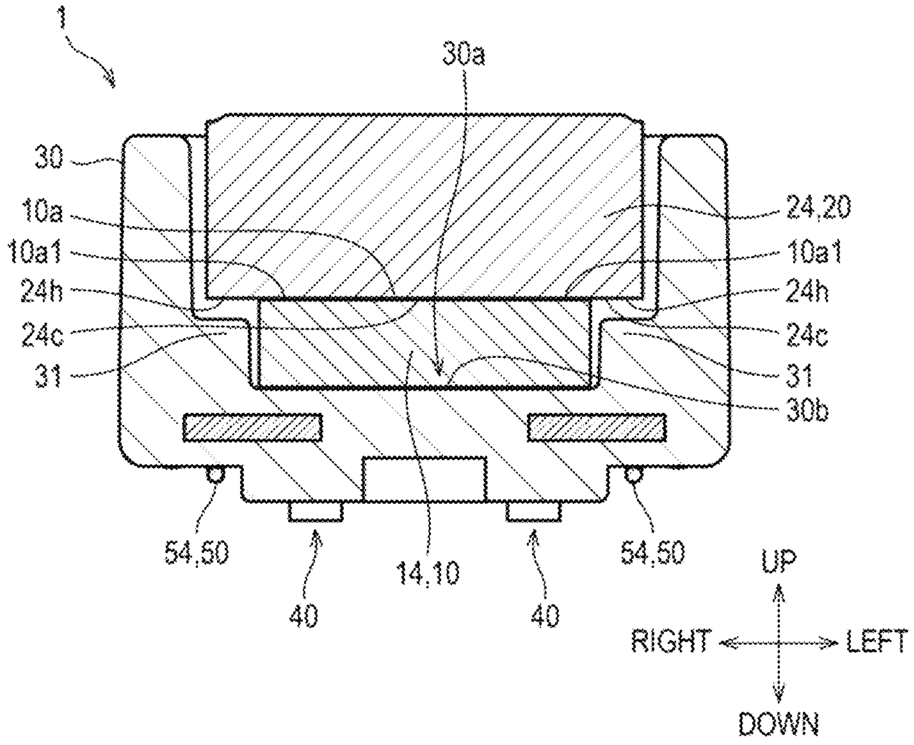
FIG. 9B is a sectional view in which the cross section along the alternate long and short dash line in FIG. 4 is viewed in a direction of an arrow line IX-IX.

As illustrated in FIG. 9A, the bottom surface section 30*a* includes a pair of elevated sections 31. As illustrated in FIG. 9B, the pair of elevated sections 31 project upward from a surface (a bottom surface 30*b*) on which the first core 10 is placed in the bottom surface section 30*a*. The pair of elevated sections 31 are disposed across the first core 10 in the width direction of the base unit 30. A positional shift of the first core 10 is satisfactorily suppressed by the pair of elevated sections 31.

In the present embodiment, as illustrated in FIG. 2, a side surface (a surface facing the inner side in the left-right direction) of the elevated section 31 continuously ranges to a side surface (a surface facing the inner side in the left-right direction) of the winding core side section 35. The side surface of the elevated section 31 also continuously ranges to the second side surfaces 38*d* (see FIG. 7A) in the restricting section 38. That is, the side surface of the elevated section 31, the side surface of the winding core side section 35, and the second side surface 38*d* in the restricting section 38 are disposed on the same plane (a surface extending in the axial direction). The first core 10 is positioned in the axial direction by a surface formed by the side surface of the elevated section 31, the side surface of the winding core side section 35, and the second side surface 38*d* in the restricting section 38.

As illustrated in FIG. 9B, in the present embodiment, the side surfaces of the first core 10 and the elevated sections 31 (the side surfaces of the elevated sections 31) are separated. That is, gaps are provided between the side surfaces of the first core 10 and the side surfaces of the elevated sections 31. An adhesive or the like may be poured into the gaps. Alternative to the present embodiment, the side surface of the first core 10 and the side surface of at least one elevated section 31 may be in contact.

As illustrated in FIG. 9B, the lower surface 24*c* of the leg 24 and the upper surface 10*a* of the core end portion 14 of the first core 10 are disposed to be opposed. More specifically, the lower surface 24*c* of the leg 24 is in surface contact with the upper surface 10*a* of the first core 10. Accordingly, compared with when lower surface end portions 24*h* of the leg 24 of the second core 20 are not in contact with the upper surface 10*a* of the first core 10, a leakage flux between the lower surface end portions 24*h* of the second core 20 and the upper surface 10*a* of the first core 10 decreases. In the present embodiment, the leg 24 is formed wider than the core end portion 14. Specifically, both the end portions (the lower surface end portions 24*h*) of the lower surfaces 24*c* of the leg 24 in the width direction (the left-right direction) of the base unit 30 are disposed further on the outer side (extend further to the outer side) in the width direction than each of both the end portions (upper surface end portions 10*a*1) of the upper surface 10*a* of the core end portion 14 in the width direction. In other words, the side surfaces (the side surfaces facing the outer side in the left-right direction) of the leg 24 are disposed further on the outward side in the left-right direction than the side surfaces (the side surfaces facing the outer side in the left-right direction) of the core end portion 14.

Both the end portions (the lower surface end portions 24*h*) of the lower surface 24*c* of the leg 24 are opposed to and separated from the upper surfaces of the elevated sections 31. That is, there are gaps between the lower surface end portions 24*h* and the upper surfaces of the elevated sections 31. Since the elevated sections 31 and the second core 20 are separated, the first core 10 and the second core 20 are more securely in contact. Therefore, a leakage flux between the first core 10 and the second core 20 decreases. The elevated sections 31 made of resin generally have a larger coefficient of thermal expansion than the first core 10 made of a magnetic material such as ferrite. In contrast, since gaps are provided in the up-down direction between the elevated sections 31 and the second core 20, even when heat is generated at the time of use of the coil component 1 and the elevated sections 31 are unexpectedly greatly expanded and deformed upward, the elevated sections 31 are prevented from coming into contact with the second core 20 to push up the second core 20 such that the first core 10 and the second core 20 are separated.

Second Embodiment

Figure 10:
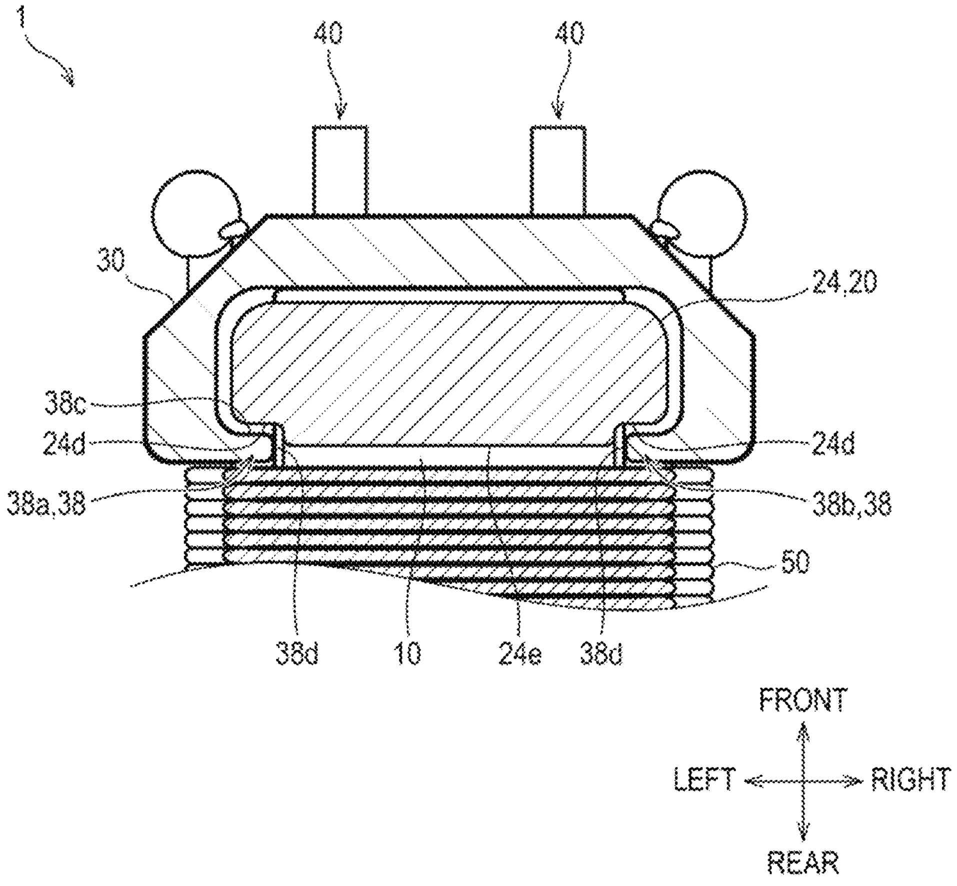
FIG. 10 is a cross-sectional view of a front end portion of a coil component according to a second embodiment of the present invention and the vicinity of the front end portion.

FIG. 10 is a cross-sectional view showing an example of the coil component 1 according to the present embodiment.

First, an overview of the coil component 1 in the present embodiment is explained.

The coil component 1 in the present embodiment has the following characteristics like the coil component 1 in the first embodiment.

The base unit 30 includes leg restricting sections (the restricting sections 38). The restricting sections 38 are disposed on the inward side of the leg 24 in the axial direction.

The distance between the restricting sections 38 and the lower end portion 24*a* in the leg 24 is smaller than the distance between the restricting sections 38 and the upper end portion 24*b* of the leg 24 (see FIG. 8 in the first embodiment).

The bottom surface section 30*a* includes the pair of elevated sections 31. The pair of elevated sections 31 are disposed across the first core 10 in the width direction of the base unit 30 (see FIG. 9A and FIG. 9B in the first embodiment).

Both the end portions (the lower surface end portions 24*h*) of the lower surface 24*c* are opposed to and separated from the upper surfaces of the elevated sections 31 (see FIG. 9A and FIG. 9B in the first embodiment).

The leg 24 in the present embodiment is different from the leg 24 in the first embodiment in that the leg 24 in the present embodiment includes a projecting section (the step section 24*e*). The step section 24*e* projects inward in an orthogonal direction (the front-rear direction in FIG. 10) from the inner side surfaces 24*d* of the leg 24. The step section 24*e* is disposed between the pair of restricting sections 38.

Since the leg 24 includes the step section 24*e*, it is possible to enlarge a magnetic path cross section by a sectional area of the step section 24*e* without increasing the length of a magnetic path formed by the second core 20 and the first core 10. Since the step section 24*e* is disposed between the restricting sections 38 in the width direction, it is possible to more satisfactorily suppress a lateral shift or a rotational shift of the second core 20.

Subsequently, the coil component 1 in the present embodiment is explained in detail.

The coil component 1 in the present embodiment is different from the coil component 1 in the first embodiment in the shape of the leg of the second core.

The step section 24*e* in the present embodiment extends from the upper end to the lower end of the leg 24. That is, the step section 24*e* extends in the up-down direction (the paper surface depth direction in FIG. 10). Alternative to the present embodiment, the step section 24*e* may be formed in only a part in the up-down direction of the leg 24. For example, the step section 24*e* may not be formed near the upper end or near the lower end of the leg 24.

The width dimension (the dimension in the left-right direction) of the step section 24*e* in the present embodiment is equivalent to the width dimension of the first core 10. For this reason, substantially the entire lower surface of the step section 24*e* is in contact with the upper surface 10*a* of the first core 10 (see FIG. 9B).

The pair of restricting sections 38 (the first restricting section 38*a* and the second restricting section 38*b*) disposed to be separated in the left-right direction in the present embodiment as in the first embodiment includes the second side surfaces 38*d* facing a space between the pair of restricting sections 38. The step section 24*e* being disposed between the pair of restricting sections 38 more specifically means that the step section 24*e* is disposed between the respective second side surfaces 38*d* of the pair of restricting sections 38.

In the present embodiment, as illustrated in FIG. 10, the orthogonal direction of the second core 20 coincides with the front-rear direction.

Instead of the form illustrated in FIG. 10, the orthogonal direction of the second core 20 may be inclined with respect to the axial direction as illustrated in FIG. 7B in the first embodiment.

In that case, the distance between the second side surface 38*d* in one restricting section 38 (the first restricting section 38*a*) and the step section 24*e* is preferably larger than the distance between the second side surface 38*d* in the other restricting section 38 (the second restricting section 38*b*) and the step section 24*e*. Here, the distance between the second side surface 38*d* of the restricting section 38 and the step section 24*e* is, for example, the distance in the left-right direction between second side surface 38*d* of the restricting section 38 and a side surface (a side surface facing the outer side in the left-right direction) of the step section 24*e*.

Preferably, the leg 24 is in contact with the first restricting section 38*a* of the pair of restricting sections 38 and the leg 24 is separated from the second restricting section 38*b* of the pair of restricting sections 38.

The second side surface 38*d* in the first restricting section 38*a* and the side surface (the side surface facing the outer side in the left-right direction) of the step section 24*e* of the leg 24 may be in contact. The first side surface 38*c* in the first restricting section 38*a* and the inner side surface 24*d* of the leg 24 may be in contact.

Third Embodiment

Figure 11A:
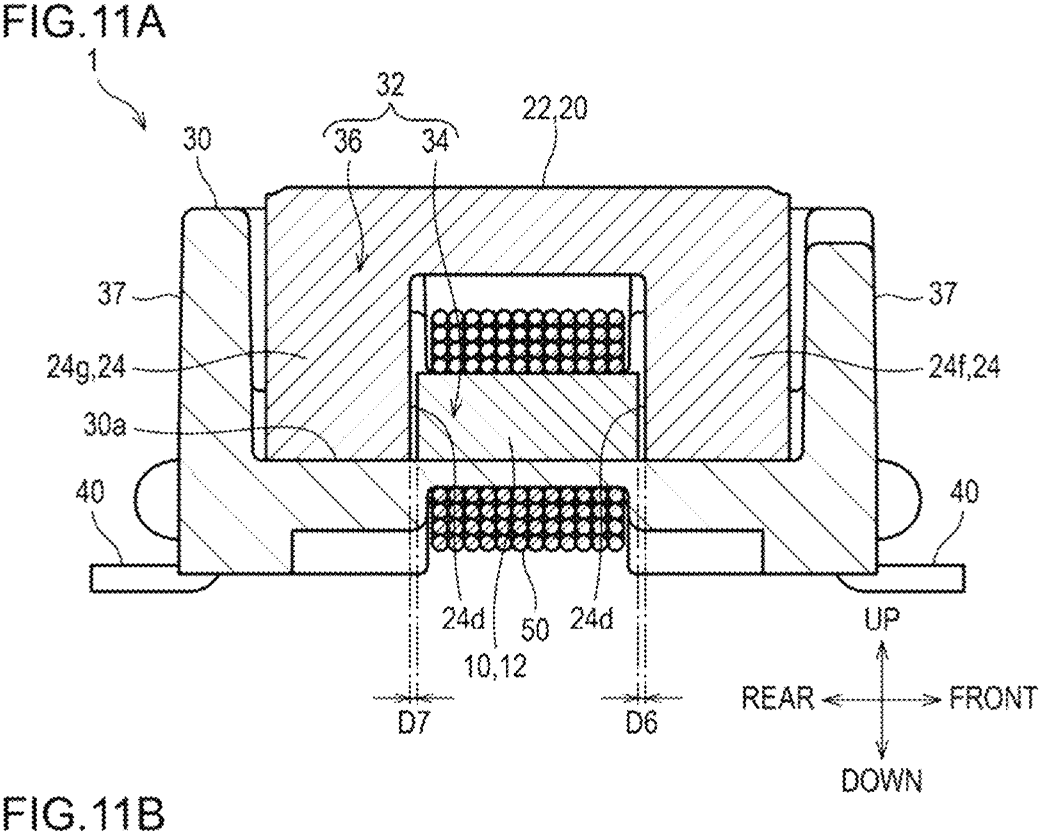
FIG. 11A is a longitudinal sectional view showing an example of a coil component according to a third embodiment of the present invention.
Figure 11B:
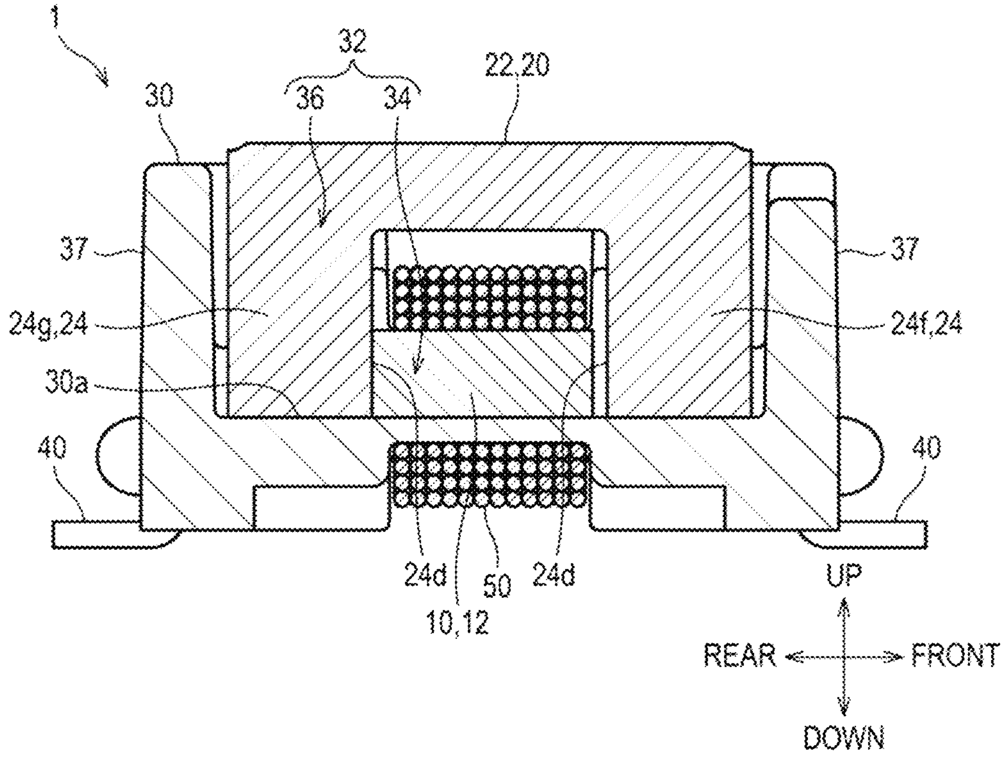
FIG. 11B is a longitudinal sectional view showing another example of the coil component according to the third embodiment.

FIG. 11A and FIG. 11B are longitudinal sectional views showing an example of the coil component 1 according to the present embodiment.

First, an overview of the coil component 1 in the present embodiment is explained.

The coil component 1 in the present embodiment has the following characteristics like the coil component 1 in the first embodiment.

The base unit 30 includes leg restricting sections (the restricting sections 38). The restricting sections 38 are disposed on the inward side of the leg 24 in the axial direction.

The orthogonal direction of the second core 20 may be inclined with respect to the axial direction (see FIG. 7B in the first embodiment).

The leg 24 is in contact with the first restricting section 38*a* of the pair of restricting sections 38 and the leg 24 is separated from the second restricting section 38*b* of the pair of restricting sections 38 (see FIG. 7B in the first embodiment).

The distance between the restricting sections 38 and the lower end portion 24*a* in the leg 24 is smaller than the distance between the restricting sections 38 and the upper end portion 24*b* of the leg 24 (see FIG. 8 in the first embodiment).

As illustrate in FIG. 11A, the second core 20 in the present embodiment is common to the second core 20 in the first embodiment in that the second core 20 in the present embodiment includes the leg 24 at each of both the end portions in the axial direction. On the other hand, the first core 10 in the present embodiment is different from the first core 10 in the first embodiment in that the first core 10 is disposed between two legs 24 in the axial direction.

With the configuration explained above, the end portions of the first core 10 in the axial direction and the legs 24 of the second core 20 can be separated in the axial direction. Accordingly, compared with when the second core 20 is placed on the core end portions 14 of the first core 10 as in the first embodiment and the second embodiment, it is possible to provide a gap between the first core 10 and the second core 20 without using a spacer sheet of a nonmagnetic body.

Subsequently, the coil component 1 in the present embodiment is explained in detail.

The coil component 1 in the present embodiment is different from the coil component 1 in the first embodiment and the second embodiment in the shape of a first core and the shape of a second core.

As illustrated in FIG. 11A, in the present embodiment, the second core 20 is placed on the bottom surface section 30*a*. As in the first embodiment, the legs 24 are disposed in the second space 36 in the housing recess 32.

On the other hand, the first core 10 in the present embodiment is disposed in only the first space 34 and is not disposed in the second space 36. That is, the first core 10 is not disposed below the legs 24. The entire first core 10 is the winding core section 12. Substantially the entire first core 10 is disposed on the inner diameter side of the coil 50. The first core 10 is disposed in the front-rear direction between the respective inner side surfaces 24*d* of the pair of legs 24 disposed to be separated in the front-rear direction.

The distance (a distance D6 in FIG. 11A) between the first leg 24*f* and the first core 10 may be larger than the distance (a distance D7 in FIG. 11A) between the second leg 24*g* and the first core 10.

By disposing the first core 10 to be closer to one leg 24 of the second core 20, it is possible to satisfactorily reduce a product error for the position of the first core 10 with respect to the position of the second core 20. In other words, by disposing the first core 10 unevenly to the side of one leg 24 and, in particular, disposing the first core 10 in contact with one leg 24, it is possible to reduce a product error because the first core 10 can be positioned in the front-rear direction.

Note that a total of the distances (a totaled value of the distance D6 and the distance D7) between the first core 10 and the legs 24 is constant regardless of whether the first core 10 is disposed in the center of the pair of legs 24 and 24 in the front-rear direction or the first core 10 is disposed further on the front side or the rear side than the center of the pair of legs 24 and 24 in the front-rear direction. That is, by separating the first core 10 and the second core 20 (the legs 24) in the front-rear direction to form a gap, it is possible to reduce an error of a magnetic characteristic due to the position of the first core 10.

Here, the distance between the legs 24 and the first core 10 is more specifically the distance in the front-rear direction between the inner side surfaces 24*d* of the legs 24 and side surfaces facing the outward side in the front-rear direction among the surfaces of the first core 10.

The distance D6 being larger than the distance D7 includes a case in which the distance D7 is zero. That is, as illustrated in FIG. 11B, the inner side surface 24*d* of the second leg 24*g* and the side surface of the first core 10 may be in contact.

Note that the present invention is not limited to the embodiments explained above and includes forms such as various modifications and improvements as long as the object of the present invention is achieved.

The embodiments explained above include the following technical ideas.

(1) A coil component comprising:
- a first core;
- a base unit in which a housing recess is formed and the first core is housed in the housing recess;
- a terminal unit provided in the base unit;
- at least one coil connected to the terminal unit and spirally disposed around a winding core section in the first core and the base unit; and
- a second core disposed above the first core, wherein
- the second core includes a flat plate section and a leg extending from one end portion in an axial direction of the coil of the flat plate section toward a bottom surface of the housing recess,
- the housing recess includes a first space in which the winding core section is housed and a second space that is a space different from the first space and in which the leg is housed, and
- the base unit includes a leg restricting section disposed on an inward side of the leg in the axial direction.

(2) The coil component of (1), wherein
- the leg includes an inner side surface facing the leg restricting section side, and
- an orthogonal direction, which is a direction orthogonal to the inner side surface, is inclined with respect to the axial direction.

(2-1) The coil component, wherein an angle formed by the orthogonal direction and the axial direction is larger than 0 degrees and smaller than 10 degrees.

(2-2) The coil component, wherein the angle formed by the orthogonal direction and the axial direction is larger than 0 degrees and smaller than 5 degrees.

(2-3) The coil component, wherein a dimension of a lower surface of the leg in a width direction of the coil component is larger than a dimension of an upper surface of a core end portion in the width direction of the coil component.

(3) The coil component of (2), wherein
- the base unit includes a pair of the leg restricting sections disposed on both sides of the first core in a width direction of the base unit, and
- the leg is in contact with a first leg restricting section of the pair of leg restricting sections and is separated from a second leg restricting section of the pair of leg restricting sections.

(3-1) The coil component, wherein a side surface facing an outward side of the leg in the axial direction is in contact with a sidewall section.

(4) The coil component of (3), wherein the leg includes a projecting section projecting inward in the orthogonal direction from the inner side surface, and the projecting section is disposed between the pair of leg restricting sections.

(4-1) The coil component, wherein a distance between a second side surface in one restricting section and a step section is larger than a distance between a second side surface in another restricting section and the step section.

(5) The coil component of (1) to (4), wherein a side surface facing the leg in the leg restricting section is inclined obliquely with respect to a placing direction at a time when the second core is placed on the first core, and a distance between the leg restricting section and a lower end portion in the leg is smaller than a distance between the leg restricting section and an upper end portion of the leg.

(5-1) The coil component, wherein a first side surface is inclined to an outward side in a front-rear direction toward a bottom surface section side.

(6) The coil component of (1) to (5), wherein a bottom surface section defining the second space in the base unit includes a pair of elevated sections projecting upward from a surface on which the first core is placed in the bottom surface section, the pair of elevated sections being disposed across the first core in a width direction of the base unit.

(7) The coil component of (6), wherein a lower surface of the leg and an upper surface of the one end portion are disposed to be opposed, both end portions of the lower surface of the leg in the width direction of the base unit are disposed further on an outer side in the width direction than each of both end portions of the upper surface of the one end portion in the width direction, and both the end portions on the bottom surface of the second core are opposed to and separated from upper surfaces of the elevated sections.

(8) The coil component of (1) to (7), wherein the second core includes the leg at each of both end portions in the axial direction, and the first core is disposed between a pair of the legs in the axial direction.

(9) The coil component of (8), wherein a distance between a first leg of the legs and the first core is larger than a distance between a second leg of the legs and the first core.

REFERENCE SIGNS LIST

1 Coil component

10 First core, **10*a* Upper surface, 10*al*** Upper surface end portion,

12 Winding core section, 14 Core end portion

20 Second core, 22 Flat plate section, 24 Leg, **24*a* Lower end portion, 24*b* Upper end portion, 24*c* Lower surface, 24*d* Inner side surface, 24*e* Step section, 24*f* First leg, 24*g* Second leg, 24*h*** Lower surface end portion

30 Base unit, **30*a* Bottom surface section, 30*b* Bottom surface, 31 Elevated section, 32 Housing recess, 34 First space, 35 Winding core side section, 36 Second space, 37 Sidewall section, 38 Restricting section, 38*a* First restricting section, 38*b* Second restricting section, 38*c* First side surface, 38*d*** Second side surface

40 Terminal unit, 42 Connecting wire section, 44 Intermediate section, 46 Mounting section

50 Coil, 51 First coil, 52 Second coil, 53 Winding section, 54 Drawn-out section

The invention claimed is:

1. A coil component comprising:

a first core;

a base unit in which a housing recess is formed and the first core is housed in the housing recess;

a terminal unit provided in the base unit;

at least one coil connected to the terminal unit and spirally disposed around a winding core section in the first core and the base unit; and a second core disposed above the first core, wherein the second core includes a flat plate section and a leg extending from one end portion in an axial direction of the coil of the flat plate section toward a bottom surface of the housing recess, the housing recess includes a first space in which the winding core section is housed and a second space that is a space different from the first space and in which the leg is housed, and the base unit includes a leg restricting section disposed on an inward side of the leg in the axial direction.

2. The coil component according to claim 1, wherein the leg includes an inner side surface facing the leg restricting section side, and an orthogonal direction, which is a direction orthogonal to the inner side surface, is inclined with respect to the axial direction.

3. The coil component according to claim 2, wherein the base unit includes a pair of the leg restricting sections disposed on both sides of the first core in a width direction of the base unit, and the leg is in contact with a first leg restricting section of the pair of leg restricting sections and is separated from a second leg restricting section of the pair of leg restricting sections.

4. The coil component according to claim 3, wherein the leg includes a projecting section projecting inward in the orthogonal direction from the inner side surface, and the projecting section is disposed between the pair of leg restricting sections.

5. The coil component according to claim 1, wherein a side surface facing the leg in the leg restricting section is inclined obliquely with respect to a placing direction at a time when the second core is placed on the first core, and a distance between the leg restricting section and a lower end portion in the leg is smaller than a distance between the leg restricting section and an upper end portion of the leg.

6. The coil component according to claim 1, wherein a bottom surface section defining the second space in the base unit includes a pair of elevated sections projecting upward from a surface on which the first core is placed in the bottom surface section, the pair of elevated sections being disposed across the first core in a width direction of the base unit.

7. The coil component according to claim 6, wherein a lower surface of the leg and an upper surface of the one end portion are disposed to be opposed, both end portions of the lower surface of the leg in the width direction of the base unit are disposed further on an outer side in the width direction than each of both end portions of the upper surface of the one end portion in the width direction, and both the end portions on the bottom surface of the second core are opposed to and separated from upper surfaces of the elevated sections.

8. The coil component according to claim 1, wherein the second core includes the leg at each of both end portions in the axial direction, and the first core is disposed between a pair of the legs in the axial direction.

9. The coil component according to claim 8, wherein a distance between a first leg of the legs and the first core is larger than a distance between a second leg of the legs and the first core.

* * * * *